Nov. 23, 1948.  W. TRAUPEL  2,454,358
OUTPUT REGULATION OF CIRCUIT TYPE GAS TURBINE PLANTS
Filed Jan. 28, 1944  3 Sheets-Sheet 1
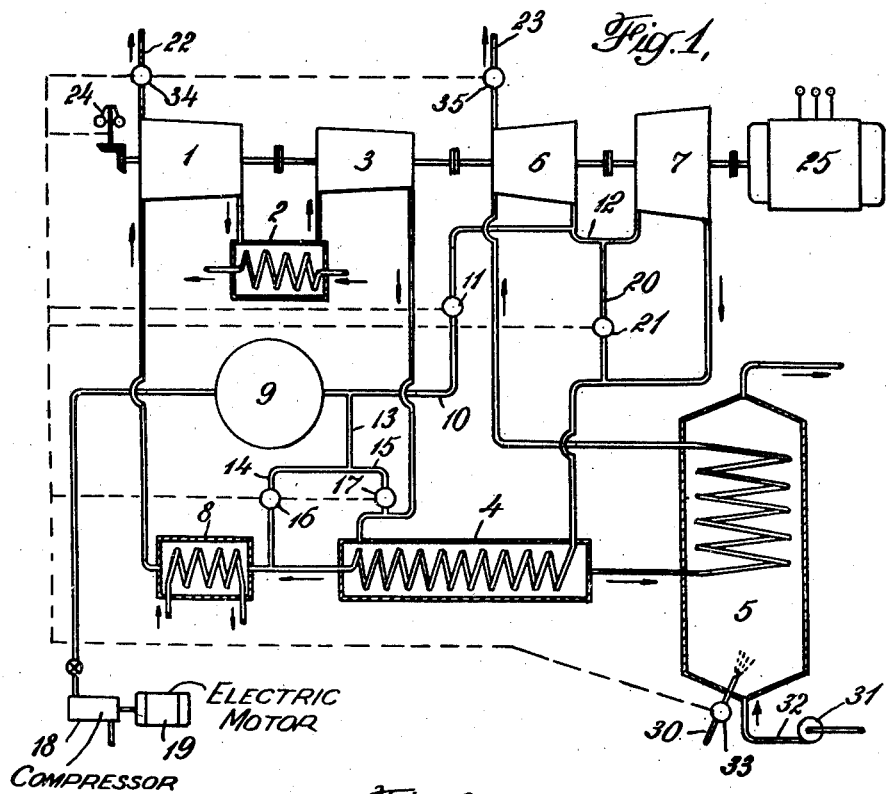
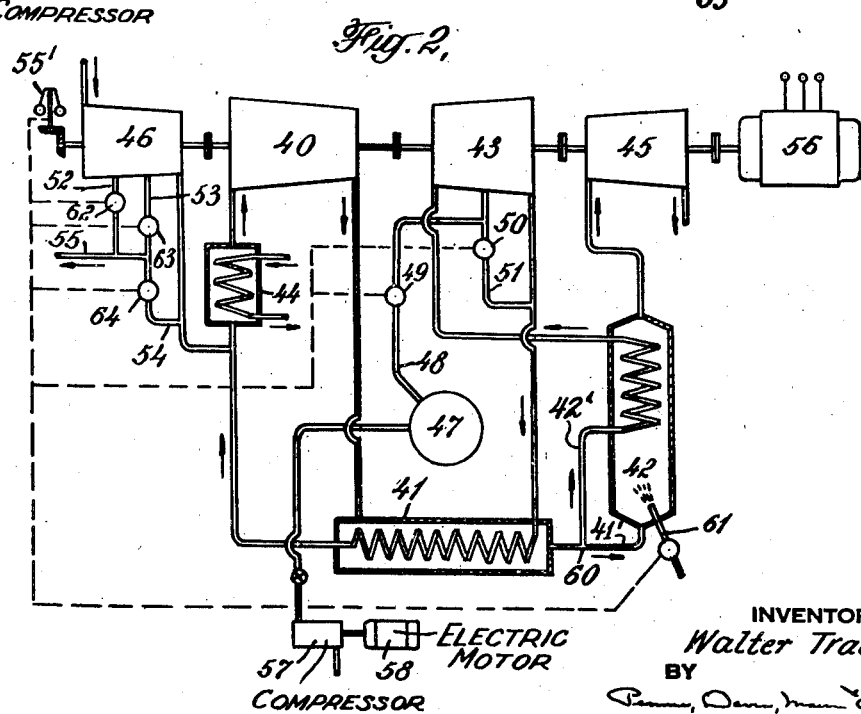
INVENTOR
*Walter Traupel*
BY
ATTORNEYS Nov. 23, 1948.                W. TRAUPEL                    2,454,358
           OUTPUT REGULATION OF CIRCUIT TYPE GAS TURBINE PLANTS
Filed Jan. 28, 1944                                    3 Sheets-Sheet 2

INVENTOR
Walter Traupel
BY
Pennie, Edmonds, Morton & Barrows
ATTORNEYS

Patented Nov. 23, 1948

2,454,358

UNITED STATES PATENT OFFICE 2,454,358

OUTPUT REGULATION OF CIRCUIT TYPE GAS-TURBINE PLANTS

Walter Traupel, Winterthur, Switzerland, assignor to Sulzer Freres, Societe Anonyme, Winterthur, Switzerland Application January 28, 1944, Serial No. 520,049
In Switzerland May 18, 1943

14 Claims. (Cl. 60—49)

1

The invention relates to a gas-turbine plant in which at least a part of the working medium performs a circuit, the sequence of pressures prevailing in the course of this circuit being adjusted in accordance with the load on the plant. The invention consists in that the working medium necessary for raising the prevailing pressures when the load increases is supplied to the circuit at least in part between two turbine stages. A bypass pipe provided in order to adapt the working of the plant to any decrease of load is preferably connected to that point in the circuit at which the supply pipe introduces the working medium.

Two embodiments of the invention are shown in simplified form in the drawings.

Fig. 1 shows a plant working with a completely closed circuit,

Fig. 2 shows a plant from the circuit of which a partial quantity of working medium is continually withdrawn and continually replaced by a make-up quantity of air.

Figure 3:
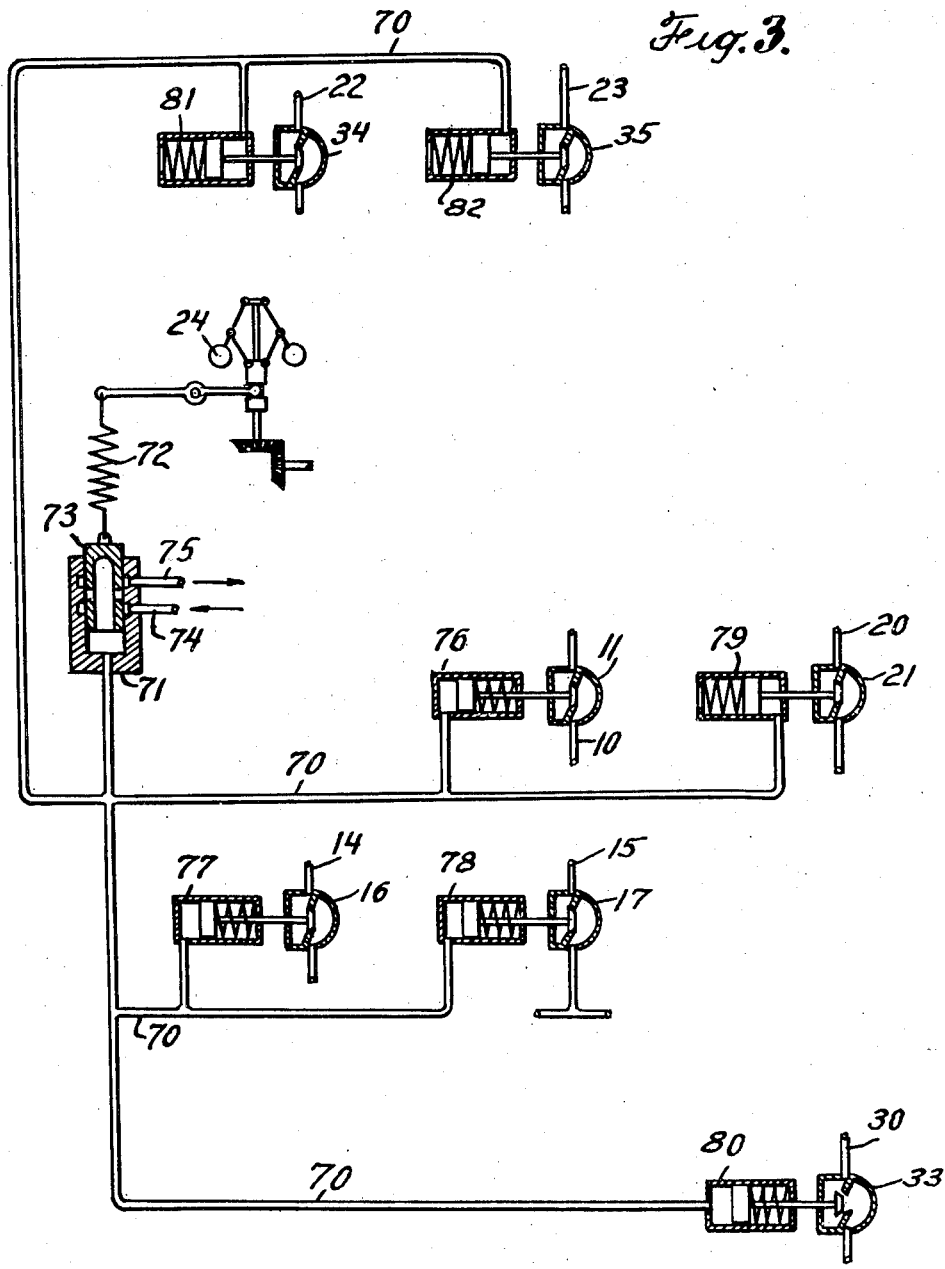
Fig. 3 is a view of the details of control apparatus shown diagrammatically in Fig. 1.

The working medium compressed by the low-pressure compressor 1 (Fig. 1) passes through the intermediate cooler 2 into the high-pressure compressor 3 and, after it has been compressed to the maximum working pressure, is preheated in the heat-exchanger 4. From the heat-exchanger 4 the working medium flows into the heater 5, in which it is brought to the maximum working temperature.

The compressed and heated working medium then flows into the high-pressure turbine 6 and immediately afterwards into the low-pressure turbine 7. After expansion the working medium passes into the heat-exchanger 4, in which it gives up a part of its residual heat to the working medium coming from the high-pressure compressor 3.

A further part of the residual heat is given off to a cooling medium in the collar 8, whereupon the working medium again flows to the low-pressure compressor 1. The working medium is thus circulated in a completely closed circuit the prevailing pressures of which can be adjusted at different heights in accordance with the load on the plant.

The compressors 1 and 3 and the turbines 6 and 7 have a common shaft to which is also coupled the generator 25, which gives off the effective output of the plant to the outside.

2

The gas heater 5 is supplied with fuel through the pipe 30 and with combustion air through the blower 31 and the pipe 32. By means of a valve 33 the quantity of fuel can be adjusted to correspond to the load.

A compressor 18 driven by the motor 19 delivers air from the atmosphere to an accumulator 9, which is connected to various points of the circuit. By way of the pipe 10 a connection is provided to the point 12 in the pipe leading from the high-pressure turbine 6 to the low-pressure turbine 7. A further connection can be established by way of the pipes 13 and 14 with a point in the circuit at which the prevailing pressure reaches roughly its minimum value, while another connection can be established by way of the pipes 13 and 15 with a point at which the prevailing pressure reaches roughly its maximum value.

To the point 12 of the pipe connecting the turbines 6 and 7 is connected a further bypass pipe 20, which conducts the circulating working medium directly into the heat-exchanger 4, thus bypassing the low-pressure turbine 7. For the purpose of withdrawing working medium from the circuit, one outlet pipe 22 is connected to the low-pressure compressor 1 and another outlet pipe 23 to the high-pressure turbine 6.

The regulating members 11, 16 and 17 provided in the connecting pipes 10, 14 and 15 respectively, the regulating member 21 arranged in the bypass pipe 20, the regulating member 33 in the fuel pipe 30 and the regulating members 34 and 35 in the outlet pipes 22 and 23 are influenced by the centrifugal governor 24.

When the load rises rapidly, the speed of rotation at first falls, as a result of which the governor 24 opens the valves 11, 16 and 17 to a greater or less degree according to the magnitude of the speed reduction, in order to supply working medium to the circuit and thus to raise the pressures prevailing in the circuit. A part of the working medium to be supplied is introduced into the circuit through the pipe 10 at the point 12 between the last stage of the high-pressure turbine and the first stage of the low-pressure turbine. Further quantities are supplied to the circuit through the pipe 14 at the point of minimum pressure and through the pipe 15 at the point of maximum pressure.

The quantity introduced between the turbine stages causes an immediate rise of pressure at that point of the working medium circuit at which the mechanical work is directly produced for driving the compressor and the generator giving off the useful output. The simultaneous supply through the pipes 14 and 15 causes a rise in pressure in the other parts of the circuit. The power developed by turbines 6 and 7 mounts in accordance with the pressure rise, so that the speed again increases.

When the speed has again reached the prescribed figure, the pressures in the piping of the plant have risen to the necessary extent. The regulating members 11, 16 and 17 are then again closed by the centrifugal governor 24. The supply of air at several points of the circuit simultaneously allows temporary changes of pressure ratios to be avoided. When the variations of the speed are small, i. e. when the changes of the load are slight, it is preferable for the regulating members 16 and 17 to be opened less wide than the regulating member 11, so as to obviate overregulation and the fluctuations occasioned by it. When the changes of load are more pronounced, all the regulating members can be opened to the same extent.

When the load decreases rapidly, the speed of the turbine at first rises. By the action of the governor 24 the valves 21, 34 and 35 in the bypass pipe 20 and the outlet pipes 22 and 23 are opened. The bypassing of the low-pressure turbine 7 through the valve 21 causes a momentary decrease in the output of the turbine, while the withdrawal of working medium through the valves 34 and 35 results in a gradual fall in the pressures prevailing in the circuit. After the speed has again been brought to the prescribed figure, the governor closes the valves 21, 34 and 35. With the pressures reduced, the output now corresponds to the diminished load.

The governing arrangement is preferably so disposed that the valves 11 or 21 are fully opened before the valves 16, 17 or 34, 35 respectively. For instance, the valve 11 is already fully open when a speed decrease of 1.5% of the normal has taken place. The valves 16, 17, on the other hand, are only fully opened when the speed has fallen by 3% of the normal. The valves 11 and 21 are opened wider and more rapidly than the other valves.

Figure 4:
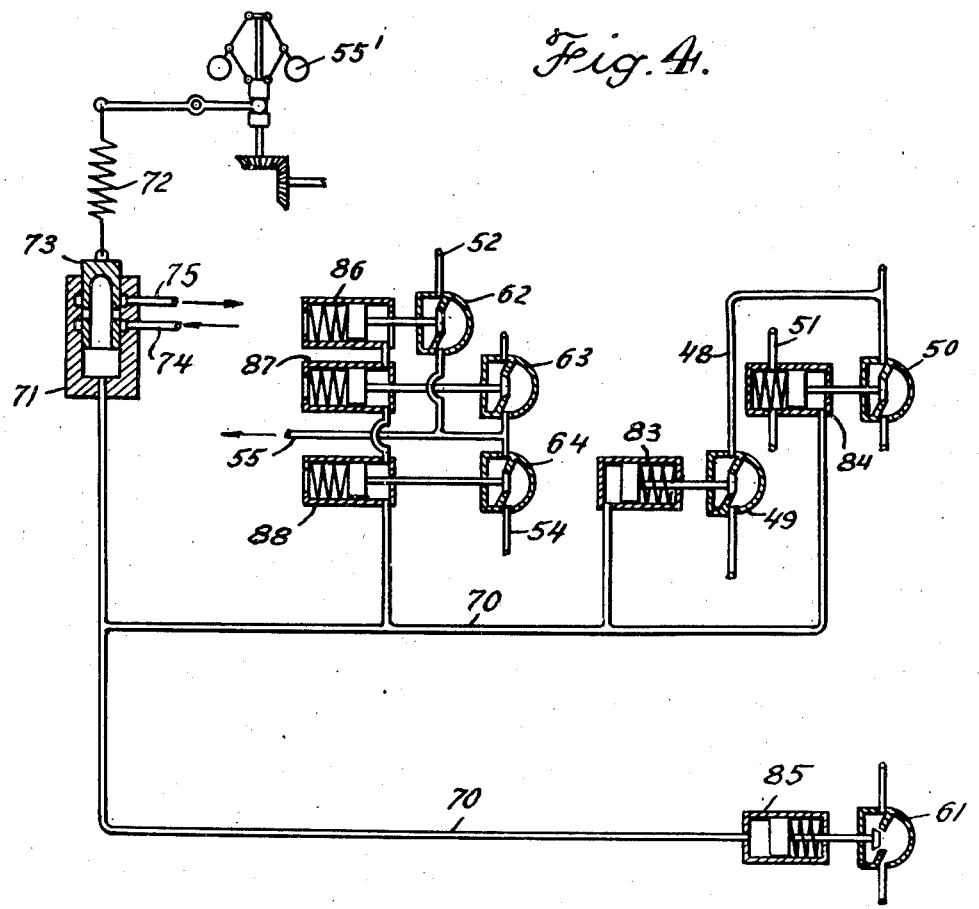
Fig. 4 is a view of the details of control apparatus shown diagrammatically in Fig. 2.

As can be seen from Figs. 3 and 4 of the attached drawing, the control of the various regulating members is effected by means of a liquid control system 70, which is connected on the one hand to the control arrangement 71 and on the other hand to the servomotors of the various regulating members. The control arrangement 71 has a slide valve 73 which is loaded through the spring 72 by the collar pressure of the governor 24 or 55'. The casing of the control arrangement is connected to the supply pipe 74 of a pressure fluid system and to the drain pipe 75. In the control system 70 a control pressure is produced which varies in proportion with the spring pressure and with the collar position of the governors 24 and 55'.

The servomotors 76, 77, 78, 79, 80, 81 and 82 of the plant, as shown in Fig. 3, are of a diameter which is so chosen, and the springs loading their pistons are so dimensioned that the order of regulating operations is realized. When the normal speed is exactly maintained, the valves 21, 34 and 35, and further the valves 11, 16 and 17, are closed. The fuel valve 33, on the other hand, is adjusted in proportion to the control pressure in the system 70. In the case of a rise of speed and thus a rise of pressure, the cross-section of this valve is reduced, while in the case of a drop of speed it is increased.

When the speed and the control pressure fall below the allocated normal values, the valve 11 first opens. When the fall from the normal value is considerable, the valves 16 and 17 are also opened simultaneously.

When the speed and the control pressure rise above the normal values, the valve 21 is first opened, then simultaneously the valves 34 and 35.

In the plant shown in Fig. 2 the working medium compressed by the compressor 40 is conducted to the heat-exchanger 41 and there preheated. In the outlet pipe of the preheater, at the point 60, the working medium is divided, part of it passes through the piping 41' into the combustion chamber of the gas heater 42 to support the combustion of fuel introduced through burner 61, the other part passes through the piping 42' into the heat exchanger portion of the gas heater 42 where it is brought up to the maximum working temperature.

The compressed and heated working medium flows into the turbine 43, expands there and then returns to the heat-exchanger 41, where it gives up part of its residual heat to the working medium coming from the compressor 40. A further part of the residual heat is given up to a cooling-medium in the cooler 44, whereupon the working medium once more flows to the compressor 40.

The circuit of the working medium is not closed, inasmuch as part of the medium is continuously withdrawn from the circuit at the branch point 60 and is supplied to the burner 61 of the gas heater 42 for use as combustion air. The combustion gases flow out of the heater into the turbine 45, from which they can be led after expansion to further points of consumption, for instance heat-exchangers, not shown in the drawing, or to atmosphere. The quantity thus withdrawn is continuously replaced by air taken from the atmosphere through the compressor 46 and supplied to the circuit before the cooler 44.

For raising the pressures in the circuit when the load increases, a compressor 57 is provided, which is driven by a motor 58. The compressor delivers air from the atmosphere to the accumulator 47. The accumulator 47 is connected to the circuit between two stages of the turbine 43 by way of the pipe 48. At the same point of the circuit a bypass pipe 51 leaves the turbine. The quantity of working medium introduced to the turbine through the pipe 48 is adjusted by the regulating member 49, and the quantity of working medium withdrawn from the turbine through the pipe 51 is adjusted by the regulating member 50.

The compressor 46 is tapped at two stages. To the lower pressure stage the outlet pipe 52 is connected and to the higher pressure stage the outlet pipe 53 is connected. The final stage also has an outlet pipe 54. All the pipes 52, 53 and 54 are in communication with a discharge pipe 55. For purposes of regulating the quantities of working medium withdrawn from the compressor, the regulating members 62, 63 and 64 are provided in the pipes 52, 53 and 54 respectively.

The turbo-machines, the turbines 43 and 45 as well as the compressors 40 and 46, are coupled to each other. Their common shaft drives the electric generator 56.

When the load increases rapidly, the regulating member 49 in the pipe 48 is influenced by the governor 55' so that air from the accumulator 47 is introduced to the circuit between two stages of the turbine 43. When the load diminishes rapidly, the regulating member 50 in the bypass pipe 51 is opened by the governor 55', so that part of the working medium bypasses the remaining part of the turbine 43 and flows directly into the heat-exchanger 41. In this way the output of the turbine is decreased.

In order that the pressures prevailing in the whole circuit may be gradually adjusted to a changed load, the actuation of the regulating valves 49 or 50 by the governor 55' is followed by the actuation of the regulating valves 62—64 in the outlet pipes 52—54 of the compressor 46. At maximum load all the regulating members are closed. The compressor then delivers the whole quantity of suction air to the circuit, so that the highest sequence of pressures arises in the latter. By successive opening of the regulating member 62, 63 and 64 the delivery pressure of the compressor 46 is decreased step-by-step without any change of speed.

By influencing the drive of the compressor 46 the pressures prevailing in the circuit are gradually adjusted to the load conditions, and the smaller, quicker changes are balanced by the withdrawal or supply of working medium from or to the turbine 43.

The servomotors 83, 84, 85, 86, 87 and 88 in the plant shown in Fig. 4 and the springs loading their pistons are so dimensioned that the order of the operating movements described is maintained. The servomotors 86, 87 and 88 hold the valves 62, 63 and 64 closed at high load, i. e. at low speed and control pressure. When the load falls, in which case speed and control pressure rise, the servomotor 86 first opens the valve 62, and if the load rises still further, when the valve 62 is completely open, the servomotor 87 will begin to open the valve 63, and finally the servomotor 88 will open the valve 64. All the valves 62—64 are fully open when the plant has reached no-load service.

The valves 49 and 50 are kept closed in a middle speed range below and above the normal value. If the speed rises pronouncedly for a time as a result of a sudden relieving of the plant, the valve 50 is opened by the servomotor 84. If the speed falls pronouncedly as a result of a sudden increase of load, the valve 49 is opened by the servomotor 83. The fuel valve 61 is regulated continuously over the whole speed range. At rising speed its cross-section of flow is increased and at falling speed reduced.

In the plants described a rapid and accurate regulation is ensured. If the air were introduced into the circuit only at one point after the turbine and before the compressor, it would only be possible to increase the output slowly, as the parts of the circuit with heightened pressure after the compressor would only receive working medium in increased quantities through the circulating compressor. A rise of pressure before and in the turbine would only take place when the pressure in the low-pressure part of the circuit had already risen. The great volume of the circuit would further slow down the increase of the pressures in the circuit necessary for raising the output.

If, as proposed in the invention, the air is introduced at one or more intermediate stages of the turbine, the pressure rises directly at a point at which the flow energy of the working medium is converted into mechanical energy in the shaft. The output of the turbines can in this way be increased before the pressure in large sections of the circuit has risen or even before there is any rise in the sequence of pressures prevailing throughout the whole circuit.

I claim:

1. In a gas turbine plant having a closed circuit for the circulation of at least a part of the gas, the improvement which comprises a compressor, a multi-stage turbine for driving the compressor and an outside load, a gas accumulator connected by conduit to the turbine at a place between two of the stages for holding gas under a higher pressure than the pressure of gas in the turbine, valve-controlled means for the conduit, valve-controlled means in the closed circuit for discharging high pressure gas that would otherwise drive the turbine, a speed governor driven in accordance with the speed of the turbine operatively connected to the valve-controlled means, said valve-controlled means for the conduit being opened when the speed falls to admit gas under pressure from the accumulator to the turbine and closed when the speed rises, said valve-controlled means in the closed circuit being opened by the governor when the speed is excessive and closed when the speed falls, whereby the speed of the plant is maintained at a predetermined rate.

2. In a gas turbine plant having a closed circuit for the circulation of at least a part of the gas, the improvement which comprises at least one turbine and at least one compressor operating on the same drive shaft, an accumulator for storing gas under pressure, a valve-controlled means for delivering gas from the accumulator to the turbine, a valve-controlled means for controlling the discharge of gas from the closed circuit, that would otherwise pass through the compressor, to a place outside the closed circuit, a speed governor driven by the turbine, and means operatively interconnecting the speed governor with said valve-controlled means, whereby on a decrease of turbine speed gas is admitted from the accumulator to the turbine and on an increase of turbine speed the gas is discharged from the closed circuit.

3. In a gas turbine plant having a circuit including a compressor, high and low pressure turbine stages in driving connection with the compressor, a heat exchanger and a heater, the improvement which comprises an accumulator for gas under pressure, valve-controlled means for passing gas from the accumulator to a place between the two turbine stages, a speed governor driven by the turbine, means connecting the governor to the valve-controlled means whereby a decrease in turbine speed results in the admission of gas from the accumulator to the place between the turbine stages.

4. In a gas turbine plant having a circuit including a compressor, high and low pressure turbine stages in driving connection with the compressor, a heat exchanger and a heater, the improvement which comprises an accumulator for gas under pressure, valve-controlled means for passing gas from the accumulator to a place between the two turbine stages, a speed governor driven by the turbine, means connecting the governor to the valve-controlled means whereby a decrease in turbine speed results in the admission of gas from the accumulator to the place between the turbine stages, a valve-controlled bypass pipe connecting the place between the two turbine stages with the inlet side of the compressor, and means connecting the governor with the valve-controlled bypass pipe whereby an increase in turbine speed results in the bypassing of gas to the compressor.

5. A gas turbine plant according to claim 4 which comprises valve-controlled means for discharging gas from the turbine to the atmosphere, and means connecting the speed governor to the valve-controlled means for discharging gas from the turbine to prevent excessive turbine speed.

6. A gas turbine plant according to claim 4 which comprises valve-controlled means for discharging gas from the compressor to the atmosphere, and means connecting the speed governor to the valve-controlled means for discharging gas from the compressor to prevent an excessive turbine speed.

7. A gas turbine plant which comprises a compressor means, high and low pressure turbine stages, said turbine stages driving the compressor means and an outside load, a heater, a heat exchanger, an accumulator, means for charging the accumulator with gas, passage means connecting the outlet of the high pressure turbine stage with the inlet of the low pressure turbine stage, a cooler connected to the inlet of the compressor, a conduit connecting the outlet of the low pressure turbine stage with the heat exchanger and the cooler, a conduit connecting the outlet of the compressor with the heat exchanger, to pass the gas in heat exchange contact with the gas flowing from the low pressure turbine stage to the cooler, and then into the heater, a conduit for passing the gas from the heater to the intake of the high pressure turbine stage, a pipe connecting the accumulator with the passage means, a valve in the pipe, a bypass connecting the passage means with the conduit connecting the low pressure turbine stage with the heat exchanger, a valve in the bypass pipe, a speed governor driven by the turbine, and means operatively connecting each valve with the governor, whereby on a decrease of turbine speed the valve in the pipe is opened and gas from the accumulator enters the passage means, and the valve in the bypass is opened to pass gas from the accumulator to the heat exchanger.

8. A gas turbine plant according to claim 7 which comprises a discharge valve for the high pressure stage of the turbine operatively connected to the governor, said discharge valve being opened on a sudden increase in turbine speed.

9. A gas turbine plant according to claim 7 which comprises a discharge valve in the conduit between the heat exchanger and the compressor means by means of which gas from the heat exchanger is prevented from passing through the compressor means, and means operatively connecting said latter discharge valve with the governor, said discharge valve being opened on a sudden increase in turbine speed.

10. A gas turbine plant according to claim 7 which comprises a first additional conduit means connecting the accumulator to the cooler, a valve in said first additional conduit means, a second additional conduit means connecting the accumulator to that part of the heat exchanger receiving gas from the outlet of the compressor means, a valve in said second additional conduit means, means operatively connecting the valve in each of said additional conduit means with the speed governor, said valves in the said additional conduit means being adjusted to open when the speed of the turbine decreases to admit gas from the accumulator to the cooler and also to the heat exchanger from which it flows through the heater and into the inlet of the high pressure stage of the turbine, said valves in the said additional compressor means being further adjusted to open after the valves in the pipe and in the bypass have opened.

11. A gas turbine plant according to claim 7 which comprises fuel burning means for the heater, means for passing part of the gas from the heat exchanger to the fuel burning means of the heater for combustion purposes, an exhaust gas turbine, means for passing the combustion gases to the exhaust gas turbine, a make-up gas compressor, means for passing gas from the make-up gas compressor to the cooler, and valve means responsive to the speed of the governor for bypassing gas from the make-up compressor to the atmosphere on an increase of turbine speed.

12. A gas turbine plant according to claim 7 which comprises fuel burning means for the heater, means for passing part of the gas from the heat exchanger to the fuel burning means of the heater for combustion purposes, an exhaust gas turbine, means for passing the combustion gases to the exhaust gas turbine, a make-up gas compressor, means for passing gas from the make-up compressor to the cooler, a gas discharge pipe, a plurality of ducts leading from different stages of the make-up compressor to the discharge pipe, a valve in each of the ducts, and means connecting the valves in the ducts with the governor, said valves being arranged to open in succession as a result of an increase of turbine speed to discharge gas from the make-up compressor into the discharge pipe.

13. A gas turbine plant comprising compressor means, a gas heater, at least one gas turbine having at least two pressure stages, conduit means forming a circuit for the working gas through said compressor means, gas heater and gas turbine, means for changing the sequence of pressures in the circuit in accordance with the load on the plant, a pipe for delivering make-up working gas to the circuit for raising the sequence of pressures when the load becomes greater, the pipe supplying the make-up working gas to the circuit at least in part at a point between two stages of the gas turbine.

14. A gas turbine plant as claimed in claim 13, comprising a bypass pipe for decreasing the sequence of pressures in the circuit, said bypass pipe being connected to the same point of the circuit as the supply pipe for the make-up working gas.

WALTER TRAUPEL.

REFERENCES CITED

The following references are of record in the file of this patent:

UNITED STATES PATENTS

| Number | Name | Date |
|---|---|---|
| 2,172,910 | Keller | Sept. 12, 1939 |
| 2,319,995 | Keller | May 25, 1943 |